United States Patent
Abe et al.

(10) Patent No.: US 7,794,885 B2
(45) Date of Patent: Sep. 14, 2010

(54) NON-AQUEOUS ELECTROLYTIC SOLUTION AND LITHIUM SECONDARY BATTERY

(75) Inventors: Koji Abe, Yamaguchi (JP); Takashi Hattori, Yamaguchi (JP); Yasuo Matsumori, Yamaguchi (JP)

(73) Assignee: Ube Industries, Ltd., Ube-shi, Yamaguchi (JP)

( * ) Notice: Subject to any disclaimer, the term of this patent is extended or adjusted under 35 U.S.C. 154(b) by 1129 days.

(21) Appl. No.: 10/579,249

(22) PCT Filed: Nov. 11, 2004

(86) PCT No.: PCT/JP2004/016749

§ 371 (c)(1),
(2), (4) Date: May 12, 2006

(87) PCT Pub. No.: WO2005/048391

PCT Pub. Date: May 26, 2005

(65) Prior Publication Data

US 2007/0082271 A1    Apr. 12, 2007

(30) Foreign Application Priority Data

Nov. 13, 2003   (JP) ............... 2003-383404
Feb. 2, 2004    (JP) ............... 2004-025833

(51) Int. Cl.
    *H01M 6/16* (2006.01)
(52) U.S. Cl. ............... 429/331; 429/330; 429/332; 429/327; 429/199; 429/200; 429/326; 429/50; 252/62.2
(58) Field of Classification Search ............... 429/199, 429/200, 50, 326, 330, 331, 332, 327; 252/62.2
    See application file for complete search history.

(56) References Cited

U.S. PATENT DOCUMENTS

| | | |
|---|---|---|
| 2002/0192565 A1 | 12/2002 | Ueda et al. |
| 2004/0142245 A1 | 7/2004 | Ishikawa et al. |
| 2005/0250007 A1 | 11/2005 | Abe et al. |

FOREIGN PATENT DOCUMENTS

| | | | |
|---|---|---|---|
| CN | 1277468 A | | 12/2000 |
| CN | 1279520 A | | 1/2001 |
| JP | 2003-109660 | | 4/2003 |
| JP | 2003-132949 | | 5/2003 |
| JP | 2003-297423 | | 10/2003 |
| JP | 2003-308875 | | 10/2003 |
| JP | 2003-317803 | | 11/2003 |
| JP | 2004-063367 | | 2/2004 |
| JP | 2004-093367 | * | 2/2004 |
| JP | 2004-349131 | | 12/2004 |
| JP | 2004-349132 | | 12/2004 |

OTHER PUBLICATIONS

International Preliminary Report on Patentability, Dated Aug. 3, 2006, PCT/JP2004/016749; Written Opinion of the International Searching Authority, Dated Aug. 3, 2006, PCT/JP2004/016749.
International Search Report for PCT/JP2004/016749 dated Mar. 1, 2005.
Chinese First Office Action, Dated Feb. 29, 2008, CN Patent Application No. 200480040412.2 0 (English Translation).
Supplementary European Search Report (European Patent Application No. 04818499.8) dated Oct. 8, 2009.

* cited by examiner

*Primary Examiner*—Laura S Weiner
(74) *Attorney, Agent, or Firm*—Nixon Peabody LLP; Jeffrey L. Costellia

(57) ABSTRACT

The present invention provides a lithium secondary battery which is improved in cycle characteristics and storage stability at an elevated temperature as well as protection from overcharge. In the battery, generation of a gas is also inhibited to prevent the battery from expansion. A non-aqueous electrolytic solution for the lithium secondary battery has an electrolyte in a non-aqueous solvent. The non-aqueous solvent is composed of a cyclic carbonate compound, a linear carbonate compound and a cyclohexylbenzene compound having a benzene ring to which one or two halogen atoms are attached. A volume ratio of the cyclic carbonate compound and the linear carbonate compound in the non-aqueous solvent is in the range of 20:80 to 40:60, or the non-aqueous solvent further contains a small amount of a branched alkylbenzene compound.

11 Claims, No Drawings

NON-AQUEOUS ELECTROLYTIC SOLUTION AND LITHIUM SECONDARY BATTERY

FIELD OF THE INVENTION

The present invention relates to a non-aqueous electrolytic solution used in preparation of a lithium secondary battery excellent in battery performance. In more detail, the battery is improved in protection from overcharge, the battery performance (cycle characteristic) is kept while repeating charge and discharge, and gas generation from decomposition is inhibited while storing the battery at an elevated temperature. The invention also relates to a lithium secondary battery.

BACKGROUND OF THE INVENTION

The lithium secondary battery has recently been widely used, for example, as an electric source for driving small-sized electronic devices. The lithium secondary battery comprises a positive electrode, a negative electrode and a non-aqueous electrolytic solution. The positive electrode generally comprises complex oxide of lithium such as $LiCoO_2$, and the negative electrode generally comprises a carbon material or metallic lithium. A cyclic carbonate such as ethylene carbonate (EC) and/or a linear carbonate such as dimethyl carbonate (DMC) have generally been used as a non-aqueous solvent in the non-aqueous electrolytic solution for the lithium secondary battery.

The recent secondary battery should give a high voltage and a high energy density. It is difficult, however to improve both the battery performances and the safety. A battery of a high energy density should particularly show high protection from overcharge, compared with the conventional battery. It is also difficult to maintain the cycle characteristics and the storage stability at high temperatures. Further, the battery tends to generate a gas, which may expand the battery. In consideration of the recent requirements on the lithium secondary battery, the performances of the battery so far developed do not satisfy the requirements. Therefore, the secondary battery should be further improved in safety while keeping the battery performances to satisfy future requirements for the high energy density.

Japanese Patent Provisional Publication No. 2003-317803 discloses an invention of adding sec-alkylbenzene or cycloalkylbenzene in which a fluorine atom is attached to the benzene ring to a non-aqueous solvent of a non-aqueous electrolytic solution for a lithium secondary battery. The publication reports that a lithium secondary battery of a high energy density shows an excellent safety performance in a function of terminating progress of overcharge by using the solution without lowering battery performance. The publication further describes that the non-aqueous solvent can further contain various known non-aqueous solvents. In working examples of the publication, ethylene carbonate (cyclic carbonate) and diethyl carbonate (linear carbonate) are used in a weight ratio of 1:1 with a small amount of vinylene carbonate.

DISCLOSURE OF THE INVENTION

Problems to be Solved by the Invention

The present inventors have noted that a lithium secondary battery prepared according to the description of Japanese Patent Provisional Publication No. 2003-317803 is improved in a function of terminating progress of overcharge. On the other hand, the inventors have found that the prepared battery does not reach a satisfactory level of discharging characteristics after repeated charge-discharge procedure (cycle characteristics).

Means to Solve the Problem

The present inventors have examined adjustment of the volume ratio of a cyclic carbonate compound and a linear carbonate compound in a non-aqueous solvent in the range of 20:80 to 40:60 (former: latter) in a non-aqueous electrolytic solution for a lithium secondary battery comprising an electrolyte in the non-aqueous solvent comprising the cyclic carbonate compound, the linear carbonate compound and a cyclohexylbenzene compound having a benzene ring to which one or two halogen atoms are attached. Namely, the inventors have so adjusted a mixing ratio that the amount of the linear carbonate would be larger than the amount of the cyclic carbonate based on both of volume and weight bases. The inventors have found that the obtained lithium secondary battery is improved in the safety from overcharge, and keeps a high level of discharging characteristics after the repeated charge-discharge procedure.

Further, the present inventors have examined addition of a small amount such as 0.01 wt. % to 3 wt. % of a branched alkylbenzene compound to a non-aqueous electrolytic solution for a lithium secondary battery comprising an electrolyte in a non-aqueous solvent comprising a cyclic carbonate compound, a linear carbonate compound and a cyclohexylbenzene compound having a benzene ring to which one or two halogen atoms are attached. The inventors have then found that the obtained lithium secondary battery is improved in the safety from overcharge, and keeps a high level of discharging characteristics after the repeated charge-discharge procedure.

Therefore, the present invention resides in a non-aqueous electrolytic solution for a lithium secondary battery comprising an electrolyte in a non-aqueous solvent comprising a cyclic carbonate compound, a linear carbonate compound and a cyclohexylbenzene compound having a benzene ring to which one or two halogen atoms are attached, wherein a volume ratio of the cyclic carbonate compound and the linear carbonate compound in the non-aqueous solvent is in the range of 20:80 to 40:60.

The invention further resides in a non-aqueous electrolytic solution for a lithium secondary battery comprising an electrolyte in a non-aqueous solvent comprising a cyclic carbonate compound, a linear carbonate compound and a cyclohexylbenzene compound having a benzene ring to which one or two halogen atoms are attached, wherein the non-aqueous electrolytic solution further contains a branched alkyl benzene compound in an amount of 0.01 wt. % to 3 wt. %. In this non-aqueous electrolytic solution of the present invention, a volume ratio of the cyclic carbonate compound and the linear carbonate compound in the non-aqueous solvent is also preferably in the range of 20:80 to 40:60

The invention furthermore resides in a lithium secondary battery comprising a positive electrode, a negative electrode and the non-aqueous electrolytic solution of the present invention defined above.

The invention still furthermore resides in a method of using a lithium secondary battery comprising a positive electrode, a negative electrode and a non-aqueous electrolytic solution of the present invention defined above, which comprises repeating charge and discharge of the battery under a charging condition that a charging termination voltage is 4.2 V or higher.

In the present invention, the cyclohexylbenzene compound having a benzene ring to which one or two halogen atoms are attached is represented by the following formula (I):

(I)

in which X is a halogen atom, n is 1 or 2, and there is no specific limitation on the substitution position on the benzene ring.

Effect of the Invention

Using the non-aqueous electrolytic solution of the present invention, a lithium secondary battery of a high energy density can be improved in safety from overcharge. The battery is excellent in cycle characteristics and storage characteristics at a high temperature. Further, generation of a gas is reduced to prevent the battery from expansion.

The non-aqueous electrolytic solution according to the present invention particularly shows a relatively low viscosity. Accordingly, the electrolytic solution can well permeate into the battery. The present inventors consider that the obtained lithium secondary battery is improved in safety from overcharge and the cycle characteristics for the reason mentioned above. The non-aqueous electrolytic solution according to the invention is excellent in permeability, and is advantageously injected into the battery. Therefore, the period for injection step in preparation of the battery can be shortened using the solution. In the present invention, the battery can be further improved in safety from overcharge using a small amount of a branched alkylbenzene compound in addition to the cyclohexylbenzene compound having a benzene ring to which one or two halogen atoms are attached.

BEST MODE FOR CARRYING OUT THE INVENTION

The preferred embodiments of the non-aqueous electrolytic solution of the present invention are described below.

The cyclic carbonate compound comprises at least two compounds selected from the group consisting of ethylene carbonate, propylene carbonate, butylene carbonate, vinylene carbonate, dimethylvinylene carbonate and vinylethylene carbonate.

The cyclic carbonate compound comprises at least one compound selected from the group consisting of vinylene carbonate, dimethylvinylene carbonate and vinylethylene carbonate, and at least one compound selected from the group consisting of ethylene carbonate, propylene carbonate and butylene carbonate.

The linear carbonate compound comprises at least one compound selected from the group consisting of methyl ethyl carbonate, dimethyl carbonate and diethyl carbonate.

The cyclohexylbenzene compound has a benzene ring to which one or two fluorine atoms are attached.

The cyclohexylbenzene compound comprises at least one compound selected from the group consisting of 1-fluoro-2-cyclohexylbenzene, 1-fluoro-3-cyclohexylbenzene and 1-fluoro-4-cyclohexylbenzene.

The non-aqueous electrolytic solution has a dynamic viscosity at 25° C. in the range of $2.3 \times 10^{-6}$ to $3.6 \times 10^{-6}$ m$^2$/s.

The branched alkylbenzene compound comprises at least one compound selected from the group consisting of isopropylbenzene, cyclohexylbenzene, tert-butylbenzene, 1,3-di-tert-butylbenzene, tert-pentylbenzene, 4-tert-butylbiphenyl, tert-pentylbiphenyl, bis(4-tert-butylphenyl) ether and bis(4-tert-pentylphenyl) ether.

A weight ratio of the branched alkylbenzene compound to the cyclohexylbenzene compound can be in the range of 0.1 to 1.

The linear carbonate compounds include linear alkyl carbonate compounds such as dimethyl carbonate (DMC), methyl ethyl carbonate (MEC), diethyl carbonate (DEC), methyl propyl carbonate (MPC), dipropyl carbonate (DPC), methyl butyl carbonate (MBC) and dibutyl carbonate (DBC). The alkyl moieties of the linear alkyl carbonate compounds have 1 to 6 carbon atoms. The alkyl moieties can have a straight or branched chain structure.

The proportion of the cyclic carbonate compound and the linear carbonate compound in the non-aqueous solvent preferably is in the range of 20:80 to 40:60 in terms of a volume ratio. If the electrolytic solution comprises the cyclic carbonate compound in excess of 40:60 in the volume ratio of the cyclic carbonate compound and the linear carbonate compound, the obtained solution tends to be too viscous to permeate into the battery. It is difficult to keep satisfactory cycle retention under the influence of the high viscosity. The influence is remarkable in a battery of a high capacity or a high energy density such as a cylindrical battery or a square-shaped battery, particularly in a cylindrical or square-shaped battery having an electrode material layer of a high density in an electrode. If the electrolytic solution comprises the cyclic carbonate compound less than 20:80 in the volume ratio of the cyclic carbonate compound and the linear carbonate compound, the conductivity of the solution tends to be low and it is difficult to keep satisfactory cycle retention. Therefore, the volume ratio of the cyclic carbonate compound and the linear carbonate compound in the non-aqueous solvent preferably is in the range of 20:80 to 40:60, and more preferably in the range of 20:80 to 35:65.

The linear carbonate preferably has a methyl group to lower the viscosity. Accordingly, the linear carbonate preferably is dimethyl carbonate or methyl ethyl carbonate. Methyl ethyl carbonate, which has low viscosity, a melting point of −20° C. or lower and a boiling point of 100° C. or higher, is a particularly preferred asymmetrical linear carbonate. The asymmetrical linear carbonate, namely methyl ethyl carbonate can be used in combination with a symmetrical linear carbonate, namely dimethyl carbonate and/or diethyl carbonate in a volume ratio of 100:0 to 51:49 (particularly, 100:0 to 70:30).

In the present invention, the non-aqueous electrolytic solution, which contains a cyclohexylbenzene compound having a benzene ring to which one or two halogen atoms are attached, preferably further contains at least two cyclic carbonate compounds and a branched alkylbenzene compound. The branched alkylbenzene compound can be contained in the solution in an amount of 0.01 wt. % to 3 wt. %. The interactions of the compounds can improve safety from overcharge, cyclic characteristics and high temperature storage characteristics. Further, gas generation is inhibited to prevent the battery from expansion. Therefore, an excellent lithium secondary battery can be obtained according to the invention.

The non-aqueous electrolytic solution comprises an electrolyte in a non-aqueous solvent, which contains the compound represented by the formula (I). In the formula (I), X is a halogen atom, such as fluorine, chlorine, bromine and iodine, preferably is fluorine or chlorine, and most preferably is fluorine.

Examples of the compounds of the formula (I) having one X group include 1-fluoro-2-cyclohexylbenzene, 1-fluoro-3-cyclohexylbenzene, 1-fluoro-4-cyclohexylbenzene, 1-chloro-4-cyclohexylbenzene, 1-bromo-4-cyclohexylbenzene and 1-iodo-4-cyclohexylbenzene. Examples of the compounds having two X groups include 1,2-dichloro-3-cyclohexylbenzene, 1,3-dibromo-4-cyclohexylbenzene, 1,4-dichloro-2-cyclohexylbenzene, 1,2-difluoro-4-cyclohexylbenzene and 1,3-difluoro-5-cyclohexylbenzene. Particularly preferred are 1-fluoro-4-cyclohexylbenzene and 1,2-difluoro-4-cyclohexylbenzene. The compounds can be used singly or in combination.

An excess amount of the compound of the formula (I) might lower battery performances. On the other hand, the amount of the compound is too small, satisfactory battery performances might not be provided. Therefore, the amount preferably is 1 wt. % or more, more preferably is 1.5 wt. % or more, and most preferably is 2 wt. % or more, based on the weight of the non-aqueous electrolytic solution. Further, the amount preferably is 10 wt. % or less, more preferably is 7 wt. % or less, and most preferably is 5 wt. % or less.

The branched alkylbenzene compound, which is preferably used in combination with the compound of the formula (I), has a benzene ring such as benzene, biphenyl and diphenyl ether to which a branched alkyl group is attached. The compound most preferably has a benzene ring to which a branched alkyl group is attached.

Examples of the branched alkylbenzene compounds include isopropylbenzene, cyclohexylbenzene, tert-butylbenzene, 1,3-di-tert-butylbenzene, tert-pentyl(amyl)benzene, 4-tert-butylbiphenyl, tert-pentyl(amyl)biphenyl, bis(4-tert-butylphenyl) ether and bis(4-tert-pentyl(amyl)phenyl) ether. Particularly preferred are cyclohexylbenzene, tert-butylbenzene and tert-pentyl(amyl)benzene. One compound can singly be used, or two or more compounds can be used in combination.

An excess amount of the branched alkylbenzene compound might lower battery performances. On the other hand, the amount of the compound is too small, satisfactory battery performances might not be provided. Therefore, the amount of the branched alkylbenzene compound preferably is 0.01 wt. % or more, more preferably is 0.1 wt. % or more, and most preferably is 0.5 wt. % or more, based on the weight of the non-aqueous electrolytic solution. Further, the amount preferably is 3 wt. % or less, more preferably is 2.5 wt. % or less, and most preferably is 2 wt. % or less. Addition of the branched alkylbenzene compound improves safety from overcharge.

The weight ratio of the branched alkylbenzene compound to the compound of the formula (I) preferably is 0.1 or more, more preferably is 0.2 or more, and most preferably is 0.25 or more. Further, the weight ratio preferably is 1 or less, more preferably is 0.8 or less, and most preferably is 0.75 or less.

The cyclic carbonate compound contained in the nonaqueous electrolytic solution according to the present invention preferably comprises at least two compounds selected from the group consisting of ethylene carbonate, propylene carbonate, butylene carbonate, vinylene carbonate, dimethylvinylene carbonate and vinylethylene carbonate. The two compounds are more preferably selected from the group consisting of ethylene carbonate, propylene carbonate, vinylene carbonate and vinylethylene carbonate. Ethylene carbonate and vinylene carbonate are particularly preferred.

An excessive amount of the cyclic carbonate contained in the non-aqueous electrolytic solution might lower battery performances. On the other hand, the amount of the compound is too small, satisfactory battery performances might not be provided. Therefore, the amount of the cyclic carbonate compound contained in the non-aqueous electrolytic solution preferably is 20 vol. % or more, and more preferably is 25 vol. % or more. Further, the amount preferably is 40 vol. % or less, and more preferably is 35 vol. % or less.

The cyclic carbonate compound having an unsaturated carbon-carbon bond such as vinylene carbonate, dimethylvinylene carbonate and vinylethylene carbonate is contained in the non-aqueous solvent in an amount of preferably 0.1 vol. % or more, more preferably 0.4 vol. % or more, and most preferably 0.8 vol. % or more. Further, the compound is contained in an amount of preferably 8 vol. % or less, more preferably 4 vol. % or less and most preferably 3 vol. % or less.

Other non-aqueous solvents can also be used in the present invention. Examples of the other solvents include lactones such as γ-butyrolactone (GBL), γ-valerolactone, and α-angelica lactone; ethers such as tetrahydrofuran, 2-methyltetrahydrofuran, 1,4-dioxane, 1,2-dimethoxyethane, 1,2-diethoxyethane, and 1,2-dibutoxyethane; nitriles such as acetonitrile, and adiponitrile; linear esters such as methyl propionate, methyl pivalate, butyl pivalate, octyl pivalate, dimethyl oxalate, ethyl methyl oxalate, and diethyl oxalate; amides such as dimethylformamide; and compounds having the S=O bonding such as glycol sulfite, propylene sulfite, glycol sulfate, propylene sulfate, divinyl sulfone, 1,3-propane sultone, 1,4-butane sultone, and 1,4-butanediol dimethane sulfonate.

The non-aqueous solvents can be mixed. Examples of combinations of the non-aqueous solvents include a combination of a cyclic carbonate and a linear carbonate, a combination of a cyclic carbonate and a lactone, a combination of a cyclic carbonate, a lactone and a linear ester, a combination of a cyclic carbonate, a linear carbonate and a lactone, a combination of a cyclic carbonate, a linear carbonate and an ether, and a combination of a cyclic carbonate, a linear carbonate and a linear ester. Preferred are the combination of the cyclic carbonate and the linear carbonate, and the combination of the cyclic carbonate, the linear carbonate and the linear ester.

An electrolyte is used in the non-aqueous electrolytic solution of the present invention. Examples of the electrolytes include $LiPF_6$, $LiBF_4$ and $LiClO_4$. The examples further include lithium salts comprising a chain alkyl group such as $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$, and lithium salts comprising a cyclic alkylene group such as $(CF_2)_2(SO_2)_2NLi$, and $(CF_2)_3(SO_2)_2NLi$. The electrolyte can be used singly or in combination. The concentration of the electrolyte salts in the non-aqueous solvent preferably is not less than 0.3 M, more preferably is not less than 0.5 M, and most preferably is not less than 0.7 M. Further, the concentration preferably is not more than 2.5 M, more preferably is not more than 1.5 M, and most preferably is not more than 1.2 M.

The electrolytic solution can be obtained according to the invention, for example by preparing a non-aqueous solvent containing the cyclic carbonate compound and the linear carbonate compound, dissolving the electrolyte in the solvent, and further dissolving the compound of the formula (I), and if necessary the branched alkyl benzene compound in the solution.

The non-aqueous electrolytic solution of the invention has a dynamic viscosity at 25° C. preferably in the range of $2.3 \times 10^{-6}$ to $3.6 \times 10^{-6}$ $m^2/s$, more preferably in the range of $2.3 \times 10^{-6}$ to $3.2 \times 10^{-6}$ m²/s, and most preferably in the range of $2.0 \times 10^{-6}$ to $3.0 \times 10^{-6}$ m²/s. The dynamic viscosity can be measured by a capillary measurement using a Cannon-Fenske viscometer.

The non-aqueous electrolytic solution of the invention can contain air or carbon dioxide to reduce gas generation caused by decomposition of the electrolytic solution and to improve battery performances such as cycle and storage characteristics.

Carbon dioxide or air can be incorporated (dissolved) in the non-aqueous electrolytic solution in the present invention according to a method (1) of contacting the non-aqueous electrolytic solution to air or a carbon dioxide-containing gas to introduce the air or the gas into the solution, and then injecting the solution into a battery, or a method of (2) injecting the non-aqueous electrolytic solution into the battery, and then introducing air or a carbon dioxide-containing gas into a battery before or after sealing the battery. The two methods can be used in combination. The amount of the moisture contained in the air or carbon dioxide-containing gas preferably is as small as possible. The amount of the moisture is so reduced that the due point of the air or gas preferably is lower than −40° C., and more preferably lower than −50° C.

The non-aqueous electrolytic solution of the present invention is used for manufacturing a lithium secondary battery. There is no specific limitation with respect to materials of the lithium secondary battery other than the non-aqueous electrolytic solution of the present invention. The materials employed for the conventional lithium secondary battery can be used in the lithium secondary battery of the present invention.

The positive electrode active material preferably is complex oxide of lithium with cobalt, manganese or nickel. The positive electrode active can be used singly or in combination. Examples of the complex lithium oxide include $LiCoO_2$, $LiMn_2O_4$, $LiNiO_2$ and $LiCo_{1-x}Ni_xO_2$ ($0.01 < x < 1$). The two or more positive electrode active materials can be mixed in an appropriate way. Examples of the mixtures include a mixture of $LiCoO_2$ with $LiMn_2O_4$, a mixture of $LiCoO_2$ with $LiNiO_2$, and a mixture of $LiMn_2O_4$ with $LiNiO_2$. The material more preferably is a complex lithium oxide showing voltage of 4.3 V or more such as $LiCoO_2$, $LiMn_2O_4$ and $LiNiO_2$ when the voltage of an open-circuit is measured using lithium as standard after completing the charge. The positive electrode active material most preferably is a complex metal oxide of lithium containing Co or Ni. A part of a complex metal oxide of lithium can be replaced with other metal. For example, a part of Co contained in $LiCoO_2$ can be replaced with Sn, Mg, Fe, Ti, Al, Zr, Cr, V, Ga, Zn or Cu.

A chemically inert electroconductive material can be used as a conductive material for the positive electrode. Examples of the conductive material include graphites such as natural graphite (e.g., scaly graphite), artificial graphite, and carbon blacks such as acetylene black, ketchen black, channel black, furnace black, lamp black, and thermal black. Graphite and carbon black can be used in combination at a certain mixing ratio. The positive electrode composite contains the conductive material preferably in an amount of 1 to 10 wt. %, and more preferably in an amount of 2 to 5 wt. %.

The positive electrode can be formed by mixing the positive electrode active material with the conductive material such as acetylene black or carbon black, and a binder to prepare a positive electrode composite material, coating a collecting sheet with the positive electrode material, and heating them at a temperature of about 50° C. to 250° C. for about 2 hours under reduced pressure. Examples of the binders include polytetrafluoroethylene (PTFE), polyvinylidene fluoride (PVDF), styrene/butadiene copolymer (SBR), acrylonitrile/butadiene copolymer (NBR), and carboxymethyl-cellulose (CMC). Examples of the collecting materials include aluminum foil and a stainless lath board.

A material capable of absorbing and releasing lithium can be used as a negative electrode (negative electrode active material). Examples of the material include: metallic lithium or lithium alloy; a carbonaceous material such as thermally decomposed carbon, coke, graphite (e.g., artificial graphite, natural graphite), a combustion product of an organic polymeric compound, or carbon fiber; tin or a tin compound; and silicon or a silicon compound. The carbonaceous material preferably has a distance ($d_{002}$) between lattice faces (002) of 0.340 nm or less. The carbonaceous material more preferably is graphite having a graphitic crystal structure with the distance ($d_{002}$) in the range of 0.335 to 0.340 nm.

The negative electrode active can be used singly or in combination. A powdery material such as a powder of carbonaceous material can be used as a negative electrode composite material by mixing the material with a binder. Examples of the binders include ethylene/propylene diene terpolymer (EPDM), polytetrafluoroethylene (PTFE), polyvinylidene fluoride (PVDF), styrene/butadiene copolymer (SBR), acrylonitrile/butadiene copolymer (NBR), and carboxymethyl-cellulose (CMC). There is no specific limitation with respect to the method for forming the negative electrode. The negative electrode can be prepared in the same manner as in the above-mentioned method for forming the positive electrode.

There is no specific limitation with respect to the structure of the lithium secondary battery. Examples of the structures include a coin-shaped battery, a cylindrical battery, and a square-shaped battery. The coin-shaped battery comprises a positive electrode, a negative electrode, and a single-layered or a multi-layered separator. The cylindrical or square-shaped battery comprises a positive electrode, a negative electrode and a rolled separator. A known separator such as a microporous material of polyolefin, a fabric, and a non-woven fabric can be used. The separator for the battery can be a single layered porous film or a multi-layered porous film.

The separator for the battery has gas permeability preferably in the range of 50 to 1,000 seconds per 100 cc, more preferably in the range of 100 to 800 seconds per 100 cc, and most preferably in the range of 300 to 500 seconds per 100 cc depending on the manufacturing conditions. In the case that the gas permeability is extremely high, the conductivity of lithium ion lowers to cause unsatisfactory function as battery separator. In the case that the gas permeability is extremely low, the mechanical strength lowers. The void volume ratio preferably is in the range of 30 to 60%, more preferably is in the range of 35 to 55%, and most preferably is in the range of 40 to 50%. The void ratio is so adjusted as to improve the battery capacity. The thickness of the separator for the battery is preferably thin to increase the energy density. Considering both of the mechanical strength and the performance increases if the thickness of the separator is small. The thickness of the separator preferably is in the range of 5 to 50 μm, more preferably in the range of 10 to 40 μm, and most preferably in the range of 15 to 25 μm.

An effect of an additive provided in the present invention depends on density of an electrode material layer in a lithium secondary battery. The positive electrode composite layer formed on aluminum foil has a density of preferably in the range of 3.2 to 4.0 g/cm³, more preferably in the range of 3.3 to 3.9 g/cm³, and most preferably in the range of 3.4 to 3.8 g/cm³. It is difficult to prepare a battery having a density of the positive electrode of more than 4.0 g/cm³. The negative electrode composite layer formed on copper foil has a density of preferably in the range of 1.3 to 2.0 g/cm³, more preferably in the range of 1.4 to 1.9 g/cm³, and most preferably in the range of 1.5 to 1.8 g/cm³. It is difficult to prepare a battery having a density of the negative electrode of more than 2.0 g/cm³.

In the present invention, the positive electrode layer can have a thickness (per one side of the collector) in the range of 30 to 120 μm, and more preferably in the range of 50 to 100 μm. The negative electrode layer (per one side of the collector) has a thickness preferably in the range of 1 to 100 μm, and more preferably in the range of 3 to 70 μm. If the thickness the electrode layer in the lithium secondary battery of the present invention is too small, the quantity of an active material in the electrode material layer is so low as to decrease the battery capacity. If the thickness of the electrode layer is too large, the cycle and rate characteristics unfavorably lower.

There is no specific limitation with respect to the structures of the lithium secondary battery. Examples of the structure include a coin-shaped battery, a cylindrical battery, a square-shaped battery, and a lamination battery. The battery comprises a positive electrode, a negative electrode, a porous separator and a non-aqueous electrolytic solution. The cylindrical or square-shaped battery is preferred.

The lithium secondary battery of the present invention shows excellent cycle characteristics for a long term even if the charging termination voltage is higher than 4.2 V. The battery can further show excellent cycle characteristics even if the charging termination voltage is 4.3 V or more. The discharging termination voltage can be 2.5 V or more, and further can be 2.8 V or more. There is no specific limitation with respect to the current level. The battery is generally discharged at a constant current of 0.1 to 3 C. The lithium secondary battery of the present invention can be charged and discharged at a temperature of −40° C. or higher, and preferably at 0° C. or higher. Further, the battery can be charged and discharged at a temperature of 100° C. or lower, and preferably 80° C. or lower.

A safety valve can be attached to a sealing plate to keep the lithium secondary battery from increasing the inner pressure. A part of the battery such as a battery cell (can) or a gasket can have a cut to comply with pressure increase. At least one of various conventional safety attachments (for example, over-current-preventing devices such as a fuse, a bimetal and a PTC device) is preferably attached to the battery.

Two or more lithium secondary batteries of the invention can be placed in a battery package in series and/or parallel. A safety circuit (which has functions of monitoring conditions such as voltage, temperature and current in each of the battery and/or in the combined batteries, and breaking the current) can be attached to the battery package in addition to a safety attachment such as a PTC element, a thermal fuse, a fuse, and/or a current breaker.

The battery of the present invention can be used in various devices such as a mobile phone, a notebook computer, PDA, a camcorder, a compact camera, a shaver, an electric machinery tool, and an automobile. The lithium secondary battery of the invention is highly reliable, and is advantageously used in devices requiring the charging current of 0.5 A or higher.

EXAMPLES

The present invention is described by referring to the following examples and comparison examples.

Example 1

Preparation of Non-Aqueous Electrolytic Solution

A non-aqueous solvent of EC:VC(vinylene carbonate):MEC having a volume ratio of 28:2:70 was prepared. $LiPF_6$ was dissolved in the solvent to prepare 1 M non-aqueous electrolytic solution. 4 wt. % (based on the nonaqueous electrolytic solution) of 1-fluoro-4-cyclohexylbenzene (F4CHB) was added to the non-aqueous electrolytic solution. The dynamic viscosity of the electrolytic solution was $2.7 \times 10^{-6}$ $m^2/s$ at 25° C.

Preparation of Lithium Secondary Battery and Measurement of Battery Performance 90 wt. % of $LiCoO_2$ (positive electrode active material), 5 wt. % of acetylene black (conductive material), and 5 wt. % of polyvinylidene fluoride (binder) were mixed. 1-methyl-2-pyrrolidone was added to the mixture to give a slurry. A surface of aluminum foil was coated with the slurry. The coated foil was dried, and molded under pressure to form a positive electrode.

95 wt. % of artificial graphite (negative electrode active material) having a graphitic crystalline structure with a distance ($d_{002}$) of 0.335 nm between lattice faces (002), and 5 wt. % of polyvinylidene fluoride (binder) were mixed. 1-methyl-2-pyrrolidone was added to the mixture to give a slurry. A surface of copper foil was coated with the slurry. The coated foil was dried, and molded under pressure to form a negative electrode.

A battery was prepared using a separator comprising a microporous polypropylene film (thickness: 20 μm). The non-aqueous electrolytic solution was poured into the battery. Before sealing the battery, carbon dioxide having the dew point of −60° C. was introduced into the battery to prepare a cylindrical battery having the 18650 size (diameter: 18 mm, height: 65 mm). A pressure release vent and an inner current breaker (PTC element) were attached to the battery. The positive electrode had a density of 3.5 g/cm³, and the negative electrode had a density of 1.6 g/cm³. The positive electrode layer had a thickness of 70 μm (per one side of the collector), and the negative electrode layer had a thickness of 60 μm (per one side of the collector).

In a cycle test, the 18650 battery was charged with the constant current of 2.2 A (1C) at an elevated temperature (45° C.) to reach 4.3 V. The battery was further charged under the constant voltage for 3 hours in total to reach the terminal voltage of 4.3 V. The battery was discharged under the constant current of 2.2 A (1C) to reach the terminal voltage of 3.0 V. The cycle of charge and discharge was repeated. The battery performance was measured after 200 cycles. The retention of the discharging capacity relative to the initial discharging capacity (100%) was 81.3%. The battery performance is set forth in Table 1.

Example 2

A non-aqueous solvent of EC:VC:MEC having a volume ratio of 28:2:70 was prepared. $LiPF_6$ was dissolved in the solvent to prepare 1 M non-aqueous electrolytic solution. 4 wt. % (based on the non-aqueous electrolytic solution) of 1-fluoro-3-cyclohexylbenzene (F3CHB) was added to the non-aqueous electrolytic solution in place of 1-fluoro-4-cyclohexylbenzene. The dynamic viscosity of the electrolytic solution was $2.7 \times 10^{-6}$ $m^2/s$ at 25° C. A cylindrical battery was prepared in the same manner as in Example 1 using the electrolytic solution. The retention of the discharging capacity after 200 cycles is set forth in Table 1.

Example 3

A non-aqueous solvent of EC:VC:MEC having a volume ratio of 28:2:70 was prepared. $LiPF_6$ was dissolved in the solvent to prepare 1 M non-aqueous electrolytic solution. 4 wt. % (based on the non-aqueous electrolytic solution) of 1-fluoro-2-cyclohexylbenzene (F2CHB) was added to the non-aqueous electrolytic solution in place of 1-fluoro-4-cyclohexylbenzene. The dynamic viscosity of the electrolytic solution was $2.7 \times 10^{-6}$ m$^2$/s at 25° C. A cylindrical battery was prepared in the same manner as in Example 1 using the electrolytic solution. The retention of the discharging capacity after 200 cycles is set forth in Table 1.

Example 4

A non-aqueous solvent of EC:VC:MEC:DMC having a volume ratio of 28:2:50:20 was prepared. LiPF$_6$ was dissolved in the solvent to prepare 1 M non-aqueous electrolytic solution. 4 wt. % (based on the non-aqueous electrolytic solution) of 1-fluoro-4-cyclohexylbenzene (F4CHB) was added to the non-aqueous electrolytic solution. The dynamic viscosity of the electrolytic solution was $2.5 \times 10^{-6}$ m$^2$/s at 25° C. A cylindrical battery was prepared in the same manner as in Example 1 using the electrolytic solution. The retention of the discharging capacity after 200 cycles is set forth in Table 1.

Example 5

A non-aqueous solvent of EC:VC:DEC having a volume ratio of 28:2:70 was prepared. LiPF$_6$ was dissolved in the solvent to prepare 1 M non-aqueous electrolytic solution. 4 wt. % (based on the non-aqueous electrolytic solution) of 1-fluoro-4-cyclohexylbenzene (F4CHB) was added to the non-aqueous electrolytic solution. The dynamic viscosity of the electrolytic solution was $3.4 \times 10^{-6}$ m$^2$/s at 25° C. A cylindrical battery was prepared in the same manner as in Example 1 using the electrolytic solution. The retention of the discharging capacity after 200 cycles is set forth in Table 1.

Comparison Example 1

A non-aqueous solvent of EC:VC:DEC having a volume ratio of 41:2:57 was prepared. The weight ratio of the cyclic carbonates to the linear carbonate was 1:1. LiPF$_6$ was dissolved in the solvent to prepare 1 M non-aqueous electrolytic solution. 4 wt. % (based on the non-aqueous electrolytic solution) of 1-fluoro-4-cyclohexylbenzene (F4CHB) was added to the non-aqueous electrolytic solution. The dynamic viscosity of the electrolytic solution was $3.7 \times 10^{-6}$ m$^2$/s at 25° C. A cylindrical battery was prepared in the same manner as in Example 1 using the electrolytic solution. The retention of the discharging capacity after 200 cycles is set forth in Table 1.

Comparison Example 2

A non-aqueous solvent of EC:VC:DEC having a volume ratio of 13:2:85 was prepared. LiPF$_6$ was dissolved in the solvent to prepare 1 M non-aqueous electrolytic solution. 4 wt. % (based on the non-aqueous electrolytic solution) of 1-fluoro-4-cyclohexylbenzene (F4CHB) was added to the non-aqueous electrolytic solution. The dynamic viscosity of the electrolytic solution was $2.2 \times 10^{-6}$ m$^2$/s at 25° C. A cylindrical battery was prepared in the same manner as in Example 1 using the electrolytic solution. The retention of the discharging capacity after 200 cycles is set forth in Table 1.

TABLE 1

| | Composition of non-aqueous electrolytic solution | Volume ratio | Retention of discharging capacity |
|---|---|---|---|
| Example 1 | EC/VC/MEC + F4CHB | 28/2/70 + 4 wt. % | 81.3% |
| Example 2 | EC/VC/MEC + F3CHB | 28/2/70 + 4 wt. % | 80.4% |
| Example 3 | EC/VC/MEC + F3CHB | 28/2/70 + 4 wt. % | 80.7% |
| Example 4 | EC/VC/MEC/DMC + F4CHB | 28/2/50/20 + 4 wt. % | 81.2% |
| Example 5 | EC/VC/DEC + F4CHB | 28/2/70 + 4 wt. % | 79.7% |
| Comp. Ex. 1 | EC/VC/MEC + F4CHB | 41/2/57 + 4 wt. % | 76.9% |
| Comp. Ex. 2 | EC/VC/DEC + F4CHB | 13/2/85 + 4 wt. % | 70.2% |

Example 6

Preparation of Non-Aqueous Electrolytic Solution

A non-aqueous solvent of EC:VC(vinylene carbonate):MEC having a volume ratio of 28:2:70 was prepared. LiPF$_6$ was dissolved in the solvent to prepare 1 M nonaqueous electrolytic solution. 2 wt. % (based on the non-aqueous electrolytic solution) of 1-fluoro-4-cyclohexylbenzene (F4CHB) and 1 wt. % of cyclohexylbenzene (CHB) were added to the non-aqueous electrolytic solution. The dynamic viscosity of the electrolytic solution was $2.7 \times 10^{-6}$ m$^2$/s at 25° C.

Preparation of Lithium Secondary Battery and Measurement of Battery Performance 90 wt. % of LiCoO$_2$ (positive electrode active material), 5 wt. % of acetylene black (conductive material), and 5 wt. % of polyvinylidene fluoride (binder) were mixed. 1-methyl-2-pyrrolidone was added to the mixture to form slurry. A surface of aluminum foil was coated with the slurry. The mixture was dried, and molded under pressure to form a positive electrode.

95 wt. % of artificial graphite (negative electrode active material) having a graphitic crystalline structure with a distance (d$_{002}$) of 0.335 nm between lattice faces (002), and 5 wt. % of polyvinylidene fluoride (binder) were mixed. 1-methyl-2-pyrrolidone was added to the mixture to give a slurry. A surface of copper foil was coated with the slurry. The mixture was dried, and molded under pressure to produce a negative electrode.

A battery was prepared using a separator comprising a microporous polypropylene film (thickness: 20 μm). The non-aqueous electrolytic solution was poured into the battery. Before sealing the battery, carbon dioxide having the dew point of −60° C. was introduced into the battery to prepare a cylindrical battery having the 18650 size (diameter: 18 mm, height: 65 mm). A pressure release vent and an inner current breaker (PTC element) were attached to the battery. The positive electrode had a density of 3.5 g/cm$^3$, and the negative electrode had a density of 1.6 g/cm$^3$. The positive electrode layer had a thickness of 70 μm (per one side of the collector), and the negative electrode layer had a thickness of 60 μm (per one side of the collector).

In a cycle test, the 18650 battery was charged with the constant current of 2.2 A (1C) at an elevated temperature (45° C.) to reach 4.3 V. The battery was further charged under the constant voltage for 3 hours in total to reach the terminal voltage of 4.3 V. The battery was discharged under the constant current of 2.2 A (1C) to reach the terminal voltage of 3.0 V. The cycle of charge and discharge was repeated. The initial discharging capacity (mAh) was the essentially same as that of Comparison Example 1 (using 1 M $LiPF_6$+EC/VC/MEC (volume ratio)=28:2:70 as the non-aqueous electrolytic solution to which 3 wt. % of cyclohexylbenzene was added in place of a specific cyclohexyl benzene compound such as 1-fluoro-4-cyclohexylbenzene). The battery performance was measured after 200 cycles, and the retention of the discharging capacity relative to the initial discharging capacity (100%) was 82.1%. Further, the amount of the generated gas after 200 cycles was remarkably smaller than that in the case of using no 1-fluoro-4-cyclohexylbenzene (Comparative Example 1).

After the cycle of charge and discharge was repeated five times, the 18650 battery was fully charged to reach 4.2 V at an ordinary temperature (20° C.), and further charged with the constant current of 2.2 A (1C) to conduct an overcharge test. The temperature on the surface of the battery was 120° C. or lower, which is the standard highest temperature for safety. The conditions for preparation of the 18650 battery and the battery performance thereof are set forth in Table 2.

Example 7

A cylindrical battery was prepared in the same manner as in Example 6, except that 2 wt. % (based on the non-aqueous electrolytic solution) of 1,2-difluoro-4-cyclohexylbenzene (D4CHB) was used in place of 1-fluoro-4-cyclohexylbenzene. The obtained cylindrical battery showed the retention of the discharging capacity after 200 cycles, as is set forth in Table 2. In the excessive charge test, the temperature on the surface of the battery was 120° C. or lower.

Example 8

A cylindrical battery was prepared in the same manner as in Example 6, except that 1 wt. % (based on the non-aqueous electrolytic solution) of tert-pentylbenzene (TPB) was used in place of cyclohexylbenzene. The obtained cylindrical battery showed the retention of the discharging capacity after 200 cycles, as is set forth in Table 2. In the excessive charge test, the temperature on the surface of the battery was 120° C. or lower.

Example 9

A cylindrical battery was prepared in the same manner as in Example 6, except that 1 wt. % (based on the non-aqueous electrolytic solution) of tert-butylbenzene (TBB) was used in place of cyclohexylbenzene. The obtained cylindrical battery showed the retention of the discharging capacity after 200 cycles, as is set forth in Table 2. In the excessive charge test, the temperature on the surface of the battery was 120° C. or lower.

Example 10

A cylindrical battery was prepared in the same manner as in Example 6, except that 1.5 wt. % (based on the non-aqueous electrolytic solution) of 1-fluoro-4-cyclohexylbenzene, 1 wt. % of tert-pentylbenzene (TPB) and 0.5 wt. % of cyclohexylbenzene (CHB) were used. The obtained cylindrical battery showed the retention of the discharging capacity after 200 cycles, as is set forth in Table 2. In the excessive charge test, the temperature on the surface of the battery was 120° C. or lower.

Example 11

A non-aqueous solvent of EC:VC:MEC:PS(1,3-propanesultone) having a volume ratio of 28:2:69:1 was prepared. $LiPF_6$ was dissolved in the solvent to prepare 1 M non-aqueous electrolytic solution. 2 wt. % (based on the non-aqueous electrolytic solution) of 1-fluoro-3-cyclohexylbenzene (F3CHB) and 1 wt. % of cyclohexylbenzene (CHB) were added to the non-aqueous electrolytic solution.

A cylindrical battery was prepared in the same manner as in Example 6, except for the preparation of the solution. The obtained cylindrical battery showed the retention of the discharging capacity after 200 cycles, as is set forth in Table 2. In the excessive charge test, the temperature on the surface of the battery was 120° C. or lower.

Example 12

A non-aqueous solvent of EC:VC:MEC:EMO(ethyl methyl oxalate) having a volume ratio of 28:2:69:1 was prepared. $LiPF_6$ was dissolved in the solvent to prepare 1 M non-aqueous electrolytic solution. 2 wt. % (based on the non-aqueous electrolytic solution) of 1-fluoro-2-cyclohexylbenzene (F2CHB) and 1 wt. % of cyclohexylbenzene (CHB) were added to the non-aqueous electrolytic solution.

A cylindrical battery was prepared in the same manner as in Example 6, except for the preparation of the solution. The obtained cylindrical battery showed the retention of the discharging capacity after 200 cycles, as is set forth in Table 2. In the excessive charge test, the temperature on the surface of the battery was 120° C. or lower.

Comparison Example 3

A cylindrical battery was prepared in the same manner as in Example 6, except that a specific cyclohexylbenzene compound such as 1-fluoro-4-cyclohexylbenzene was not used, and 3 wt. % (based on the non-aqueous electrolytic solution) of cyclohexylbenzene (CHB) was used. The obtained cylindrical battery showed the retention of the discharging capacity after 200 cycles, as is set forth in Table 2. In the excessive charge test, the temperature on the surface of the battery was 120° C. or lower.

Comparison Example 4

A cylindrical battery was prepared in the same manner as in Example 6, except that a specific cyclohexylbenzene compound such as 1-fluoro-4-cyclohexylbenzene was not used, and 3 wt. % (based on the non-aqueous electrolytic solution) of tert-butylbenzene (TBB) was used in place of cyclohexylbenzene. The obtained cylindrical battery showed the retention of the discharging capacity after 200 cycles, as is set forth in Table 2. In the excessive charge test, the temperature on the surface of the battery was higher than 140° C. The effect of protection from overcharge was not observed in the same manner as in the case using no tert-butylbenzene.

TABLE 2

| | Composition of non-aqueous electrolytic solution (Volume ratio) | Retention of discharging capacity |
|---|---|---|
| Example 6 | EC/VC/MEC + F4CHB + CHB (28/2/70 + 2 wt. % + 1 wt. %) | 82.1% |
| Example 7 | EC/VC/MEC + D4CHB + CHB (28/2/70 + 2 wt. % + 1 wt. %) | 82.4% |
| Example 8 | EC/VC/MEC + F4CHB + TPB (28/2/70 + 2 wt. % + 1 wt. %) | 83.3% |
| Example 9 | EC/VC/MEC + F4CHB + TBB (28/2/70 + 2 wt. % + 1 w. %) | 82.8% |
| Example 10 | EC/VC/MEC + F4CHB + TPB + CHB (28/2/70 + 2 wt. % + 1 w. % + 0.5 wt. %) | 83.2% |
| Example 11 | EC/VC/MEC/PS + F3CHB + CHB (28/2/69/1 + 2 wt. % + 1 w. %) | 84.1% |
| Example 12 | EC/VC/MEC/EMO + F2CHB + CHB (28/2/69/1 + 2 wt. % + 1 w. %) | 82.5% |
| Comp. Ex. 3 | EC/VC/MEC + CHB (28/2/70 + 3 wt. %) | 74.6% |
| Comp. Ex. 4 | EC/VC/MEC + TBB (28/2/70 + 3 wt. %) | 80.7%* |

Remark* The effect of protection from overcharge was not observed in the Comparison Example 4.

The present invention is not limited to the examples described above. The various combinations can be possible according to the invention. Particularly, the combinations of solvents cannot be limited to the examples. Further, the present invention can be applied to a square-shaped, coin-shaped or lamination battery, though the Examples relate to a cylindrical battery.

The invention claimed is:

1. A non-aqueous electrolytic solution for a lithium secondary battery comprising an electrolyte in a non-aqueous solvent comprising a cyclic carbonate compound comprising at least two compounds selected from the group consisting of ethylene carbonate, propylene carbonate, butylene carbonate, vinylene carbonate, dimethylvinylene carbonate and vinylethylene carbonate, a linear carbonate compound and a cyclohexylbenzene compound having a benzene ring to which one or two halogen atoms are attached, wherein the non-aqueous electrolytic solution further contains a branched alkyl benzene compound in an amount of 0.01 wt. % to 3 wt. %.

2. The non-aqueous electrolytic solution of claim 1, wherein the cyclic carbonate compound comprises at least one compound selected from the group consisting of vinylene carbonate, dimethylvinylene carbonate and vinylethylene carbonate, and at least one compound selected from the group consisting of ethylene carbonate, propylene carbonate and butylene carbonate.

3. The non-aqueous electrolytic solution of claim 1, wherein the linear carbonate compound comprises at least one compound selected from the group consisting of methyl ethyl carbonate, dimethyl carbonate and diethyl carbonate.

4. The non-aqueous electrolytic solution of claim 1, wherein the cyclohexylbenzene compound has a benzene ring to which one or two fluorine atoms are attached.

5. The non-aqueous electrolytic solution of claim 1, wherein the cyclohexylbenzene compound comprises at least one compound selected from the group consisting of 1-fluoro-2-cyclohexylbenzene, 1-fluoro-3-cyclohexylbenzene and 1-fluoro-4-cycloexylbenzene.

6. The non-aqueous electrolytic solution of claim 1, wherein the non-aqueous electrolytic solution has a dynamic viscosity at 25° C. in the range of $2.3 \times 10^{-6}$ to $3.6 \times 10^{-6}$ m$^2$/s.

7. The non-aqueous electrolytic solution of claim 1, wherein a volume ratio of the cyclic carbonate compound and the linear carbonate compound in the non-aqueous solvent is in the range of 20:80 to 40:60.

8. The non-aqueous electrolytic solution of claim 1, wherein the branched alkylbenzene compound comprises at least one compound selected from the group consisting of isopropylbenzene, cyclohexylbenzene, tert-butylbenzene, 1,3-di-tert-butylbenzene, tert-pentylbenzene, 4-tert-butylbiphenyl, tert-pentylbiphenyl, bis(4-tert-butylphenyl)ether and bis (4-tert-pentylphenyl)ether.

9. The non-aqueous electrolytic solution of claim 1, wherein the weight ratio of the branched alkylbenzene compound to the cyclohexylbenzene compound is in the range of 0.1 to 1.

10. A lithium secondary battery comprising a positive electrode, a negative electrode and the non-aqueous electrolytic solution defined in claim 1.

11. A method of using a lithium secondary battery comprising a positive electrode, a negative electrode and the non-aqueous electrolytic solution defined in claim 1, which comprises repeating charge and discharge of the battery under a charging condition that a charging termination voltage is 4.2 V or higher.

* * * * *